June 14, 1955　　　C. W. CUNDIFF, SR　　　2,710,467
POWER LIFT BLADE TERRACER-DITCHER
Filed June 15, 1950.　　　3 Sheets-Sheet 3
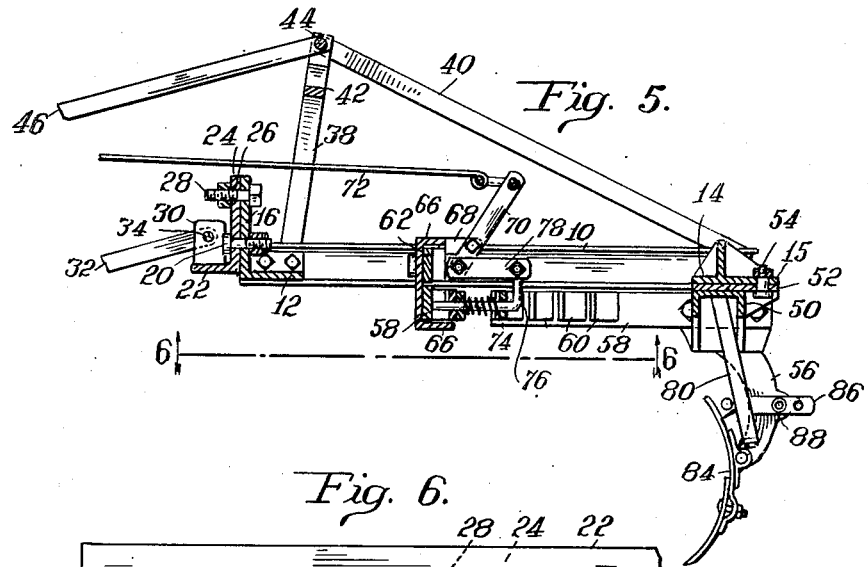
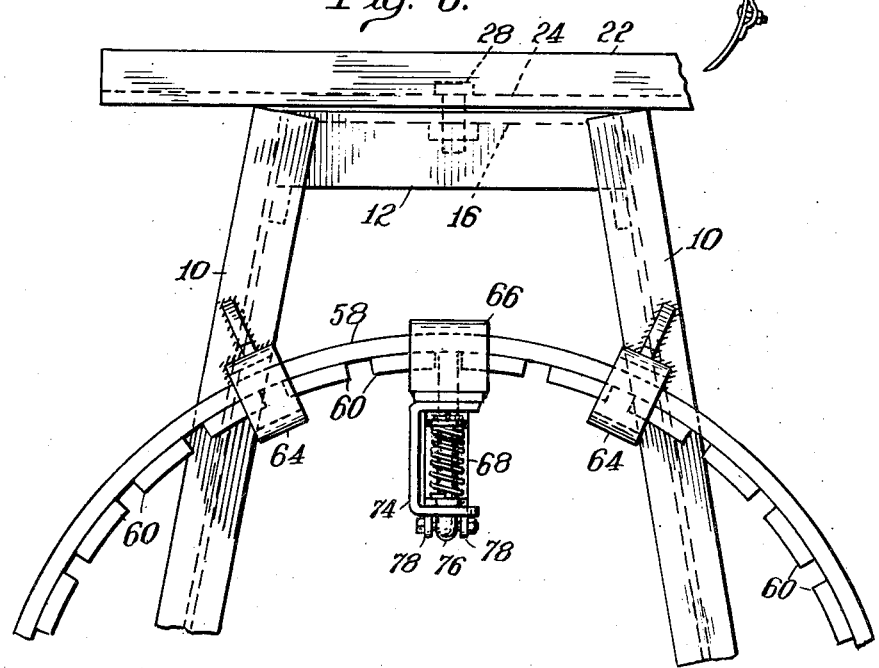
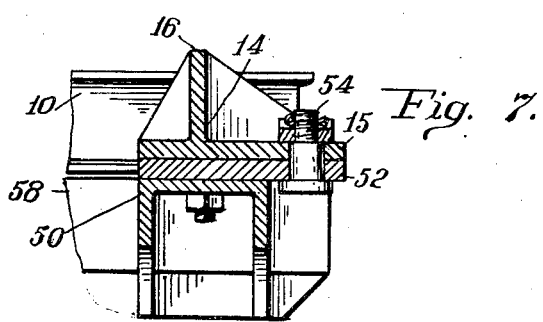
INVENTOR.
Charles W. Cundiff Sr.
BY
H. Hamlin Hodges
ATTORNEY United States Patent Office 2,710,467
Patented June 14, 1955

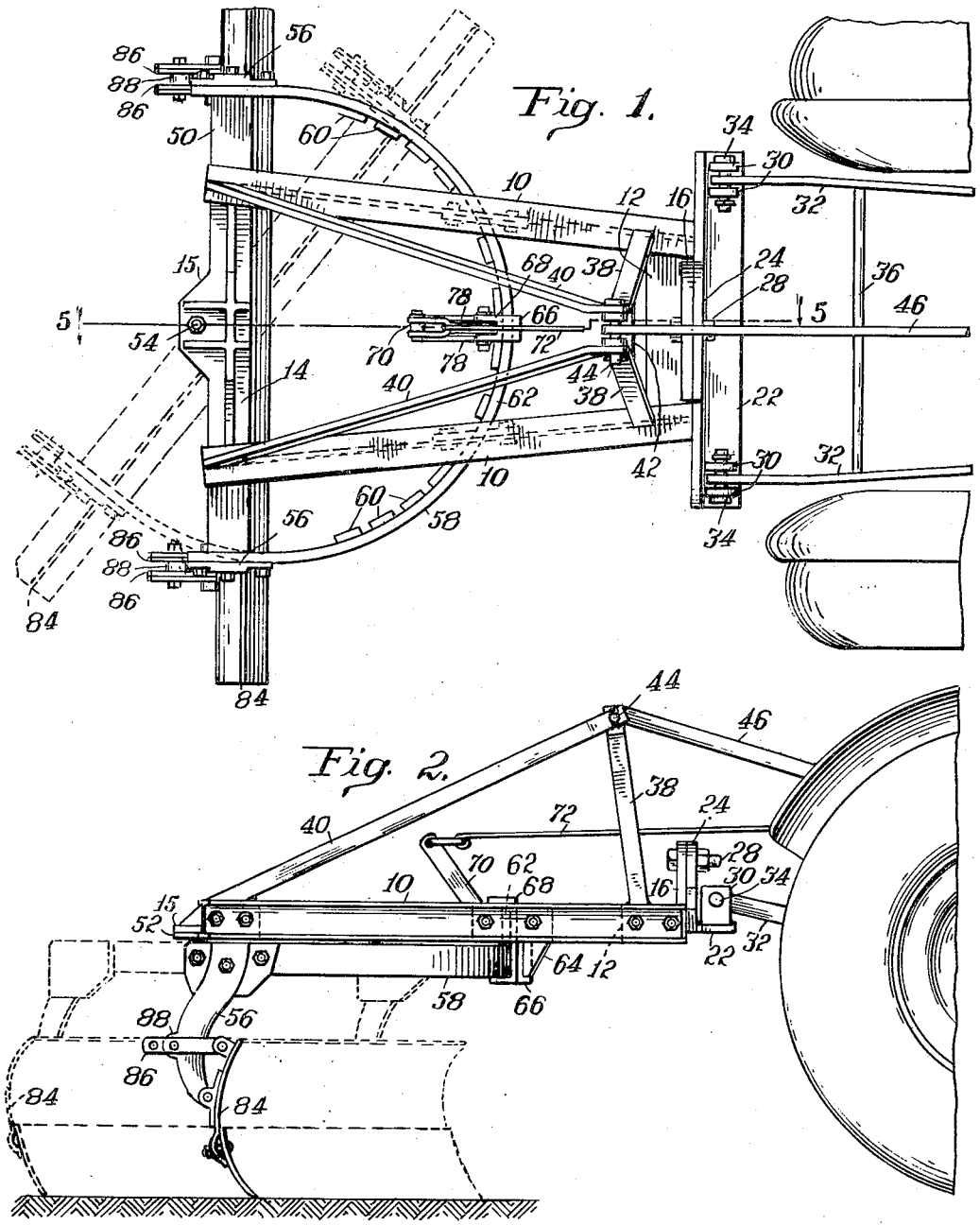

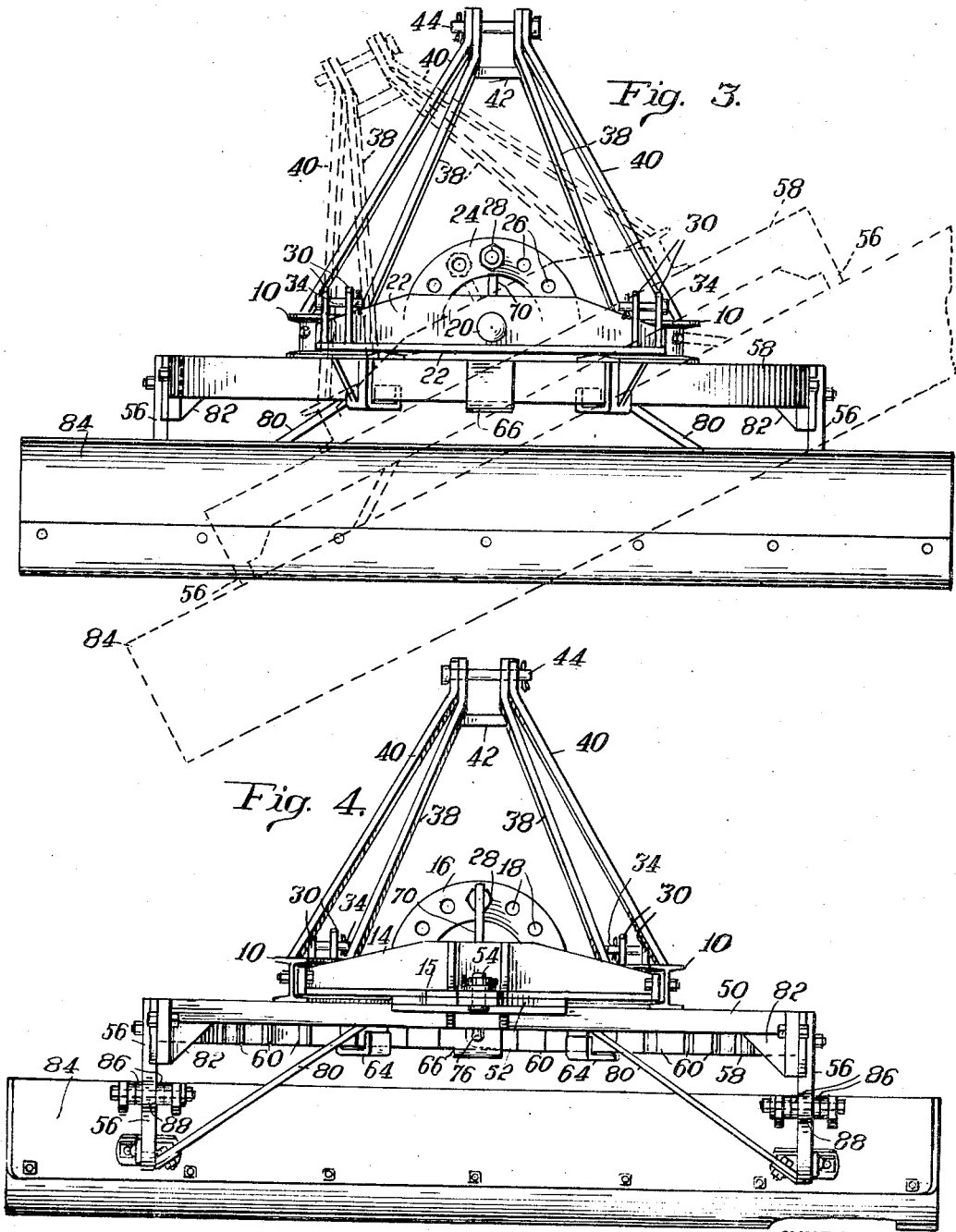

2,710,467

POWER LIFT BLADE TERRACER-DITCHER

Charles W. Cundiff, Sr., Owensboro, Ky.

Application June 15, 1950, Serial No. 168,368

3 Claims. (Cl. 37—159)

My invention relates to a terracing or ditch digging scraper adapted to be readily controlled as to the depth of the ditch, the slant of the terrace and/or the direction of slant of the scraper blade by the operator of a tractor or other traction vehicle. The ditcher is preferably made of high carbon steel to prevent its breaking and rapid wear while in use for producing ditches or terraces.

An object of my invention is to provide a terracer-ditcher which may be controlled by a single operator.

A further object is to provide a terracer-ditcher, the blade of which may be raised and lowered by the operator of a tractor.

A further object is to provide a terracer-ditcher, the angularity of the blades of which, relative to the forward motion of a tractor, may be controlled by a tractor operator.

A still further object is to provide a ditcher, the slant of the scraping blade of which may be readily controlled by a single operator.

An even further object is to provide a ditcher which may be utilized to dig a ditch relatively close to fences, walls, buildings or other protuberance extending from a ground surface.

In the drawings:

Fig. 1 is a top plan view;

Fig. 2 is a view in side elevation;

Fig. 3 is a view in front elevation;

Fig. 4 is a view in rear elevation;

Fig. 5 is a longitudinal cross-section, partly broken away, on the line 5—5 of Fig. 1, looking in the direction of the arrows;

Fig. 6 is a bottom plan view, partly broken away, and looking in the direction of the arrows 6—6 on Fig. 5; and Fig. 7 is an enlarged fragmentary vertical cross-section of the swivel connection between the blade supporting bar and the ditcher frame.

The main frame of the ditcher is composed of I-beams 10 arranged in a substantially V-shaped position and secured at their forward ends to a cross bar 12, and at their rear ends by a cross bar 14 having an outwardly extending plate 15, which will be described more fully hereinafter. The I-beams and cross bars are suitably bolted or otherwise secured together to provide a rigid frame. The cross bar 12 is provided with an upstanding arcuate flange 16 having a plurality of spaced apart apertures 18.

Pivotally bolted by the bolt 20, I provide a cross beam 22 having an upstanding arcuate flange 24 provided with spaced apart apertures 26 aligned equally with the apertures 18 in the arcuate flange 16. The cross beam 22 is thus pivotally secured to the cross bar 12 with the arcuate flanges 16 and 24 in alignment. By the use of a conventional bolt 28 placed through any two aligned apertures 18 and 26, the ditcher frame may be secured to the cross beam 22 at any desired angle. (See phantom representation in Fig. 3.)

Suitable studs 30 are secured in spaced apart pairs near the ends of the cross bar 22 and positioned between each pair of studs 30, a rod 32 is hingedly secured by pivot pins 34. The rods 32 extend forwardly, are spaced apart by a suitable spacing rod 36, and extend to a point of connection with a tractor hitch, preferably of the Ferguson type.

Extending upwardly from the I-beams 10 and welded thereto near the cross bar 12, I provide bars 38. At the ends of the I-beams 10 which are secured in spaced apart relationship by the cross bar 14, I weld upwardly extending bars 40 which extend forwardly and are welded at their upper ends to the upper ends of the bars 38. To assure the spacing apart of the bars 38, I provide a suitable spacing bar 42 which is welded in position between the two bars 38.

Suitable apertures are provided in the welded together ends of the bars 38 and 40 so that a pivot pin 44 may be placed therethrough, and also through an aperture in the rod 46 pivotally holding the same between the upper ends of the bars 38 and 40. The bar 46 extends forwardly and is suitably attached to a tractor hitch of the Ferguson type.

A cross bar 50 is provided with an outstanding plate 52 made in approximately the same shape as the outstanding plate 15 extending from the cross bar 14. A suitable pivot pin 54 extends through apertures in the plates 15 and 52, pivotally securing the two plates together. At the ends of the cross bar 50, I secure a horizontally extending arcuately formed flange 58, to the ends of which depending blade hangers 56 are secured. On the inside periphery of the arcuate flange 58, I provide a plurality of spaced apart lugs 60.

Arcuately bridging between the two I-beam frame members 10, I provide a cross brace 62 having the same degree of curvature as the flange 58. The cross member 62 is bolted or otherwise secured to the I-beams 10, is positioned directly above the arcuate flange 58, and provides a support for the latch mechanism which will be described hereinafter. Welded to the bottom sides of the I-beams 10, I provide substantially U-shaped, in cross section, supports 64.

Welded to, and depending from, the cross brace 62, I provide a support 66 adapted to support a latch and the arcuate flange 58. The latch support 66 is provided with outstanding lugs 68 on its upper side, and to which a bar 70 is pivotally attached at a point between its ends. The upper end of the bar 70 has loosely attached thereto a control rod 72 adapted to extend from the bar 70 to a convenient point within reach of the tractor operator.

Welded onto the flange support 66, I provide a U-shaped yoke 74 between the ends of which is positioned a latch bar 76 which is spring urged to be held between lugs 60 (to the left as viewed in Fig. 5). At the end of the latch bar 76 remote from its point of contact in the space between two lugs 60, I provide a right angle bend which is pivotally connected to a link 78 extending between its end and the end of the bar 70 remote from its control rod 72.

As recited above, the hangers 56 are secured to and depend from the arcuate flange 58. Near the lower ends of the hangers 56, I secure by welding or bolting, cross supports 80 which extend therefrom diagonally to a point of attachment, preferably by welding, to the underside of the cross bar 50. Other suitable corner braces 82 are properly welded or otherwise secured between the cross bar 50 and the flange 58 so that the same may be securely maintained in the position in which they are more clearly shown in Fig. 1.

The blade hangers 56 at their extreme bottom ends are pivotally connected to a scraper blade 84 which at its upper end has pivotally attached a link 86 provided with a plurality of apertures. A suitable pin may be inserted to pass through a lug 88 on the hanger 56 and selected apertures in the links 86. By selecting the apertures to be used, the pitch of the scraper blade 84 may be suitably determined.

Operation

At the time that terracing or ditch digging is to be done, an operator will first adjust the pitch of the scraper blade 84 by properly positioning the link 86 so that desired apertures therein will be in alignment with the lug 88. Also the operator will adjust the bolt 28 through desired and registering apertures 18 and 26 in their respective arcuate flanges 16 and 24. Having properly attached the rods 32 and the rod 46 to the Ferguson hitch on the tractor, the depth to which the scraper blades 84 will dig into the ground may be readily controlled by adjusting the Ferguson hitch. By lowering the end of the rod 32 connected to the terracer-ditcher, the entire ditcher will be lowered relative to the tractor. By drawing the rod 46 toward the tractor, the slant of the ditcher will be changed to provide for any desired change in the depth of dig.

At any time that the angularity of the scraper blade should be changed, the operator may draw the rod 72 toward him and thus release the latch bar 76 from its point of engagement between two lugs 60. Thus the cross bar 50, and the arcuate flange 58 may be pivoted on the pivot pin 54 (see Fig. 1) to provide a desired position of angularity. After such adjustment, the rod 72 may be released permitting the spring actuated latch bar 76 to again assume its position between two lugs 60 (see Fig. 6), holding the scraper blade 84 at the desired angle. (See the phantom lines in Fig. 1.)

I claim:

1. In a terracer-grader a substantially V-shaped frame, forward and rear cross members secured to the side members of said V-shaped frame, a vertical arcuate flange secured to said forward cross member, a substantially horizontal cross member secured to a tractor hitch, a vertical arcuate flange secured to said horizontal cross member, longitudinally extending pivot means securing said front and horizontal cross members together, a scraper blade pivotally supported by and depending from said rear cross member, and means adjustably securing said arcuate flanges and their associated cross members about said pivot relative to said tractor hitch.

2. In a terracer-grader a substantially V-shaped frame, front and rear cross members secured to the side members of said V-shaped frame, a substantially horizontal cross member secured to a tractor hitch, vertical arcuate flanges attached to said front and horizontal cross members, longitudinally extending pivot means securing said cross members and their flanges together in substantial registry, a pivotally secured scraper blade depending from said rear cross member, and means substantially parallel to said longitudinal pivot adjustably securing said arcuate flanges together about their pivot.

3. In a terracer-grader a substantially V-shaped frame, a forward cross member secured to said frame near its forward end, a vertical arcuate flange secured to and extending upwardly from said cross member, a second and independent cross member, having a like vertical flange, secured to a tractor hitch, a third cross member secured to said frame near the rear end thereof, a scraper pivotally supported by and depending from said third cross member, an arcuate rim secured to the ends of said third cross member, means secured to the under side of said V-shaped frame slidably supporting said arcuate rim, a longitudinally extending pivot pin pivotally securing said forward and second mentioned cross members together, and means associated with said arcuate flanges longitudinally securing same in adjusted position.

References Cited in the file of this patent

UNITED STATES PATENTS

| | | |
|---|---|---|
| 390,035 | Pennock | Sept. 25, 1888 |
| 951,121 | Hoisington | Mar. 8, 1910 |
| 1,529,425 | Ferguson | Mar. 10, 1925 |
| 1,864,639 | Crezee | June 28, 1932 |
| 2,309,750 | Carrington | Feb. 2, 1943 |
| 2,333,837 | Wibbels | Nov. 9, 1943 |
| 2,395,893 | Marlow | Mar. 5, 1946 |
| 2,417,595 | Heath | Mar. 18, 1947 |
| 2,434,818 | Taylor | Jan. 20, 1948 |
| 2,476,195 | Horman | July 12, 1949 |
| 2,496,760 | Watson | Feb. 7, 1950 |
| 2,530,565 | Briscoe | Nov. 21, 1950 |
| 2,560,711 | Arps | July 17, 1951 |
| 2,564,355 | Danuser | Aug. 14, 1951 |
| 2,579,553 | Daniel | Dec. 25, 1951 |
| 2,579,651 | Coviello | Dec. 25, 1951 |
| 2,629,946 | Ewers et al. | Mar. 3, 1953 |

FOREIGN PATENTS

| | | |
|---|---|---|
| 536,741 | Great Britain | May 26, 1941 |